(12) United States Patent
Oka et al.

(10) Patent No.: US 8,760,896 B2
(45) Date of Patent: Jun. 24, 2014

(54) MULTILEVEL REGENERATION DRIVE SYSTEM

(75) Inventors: Toshiaki Oka, Houston, TX (US); Mike Daskalos, Magnolia, TX (US); John Kleinecke, Magnolia, TX (US)

(73) Assignee: Toshiba International Corporation, Houston, TX (US)

( * ) Notice: Subject to any disclaimer, the term of this patent is extended or adjusted under 35 U.S.C. 154(b) by 694 days.

(21) Appl. No.: 12/850,710

(22) Filed: Aug. 5, 2010

(65) Prior Publication Data
US 2012/0033472 A1 Feb. 9, 2012

(51) Int. Cl.
*H02M 7/217* (2006.01)
*H02M 5/45* (2006.01)

(52) U.S. Cl.
USPC ............................................. 363/127; 363/37

(58) Field of Classification Search
USPC ............ 363/37, 55, 56.01, 108, 109, 87, 114, 363/124, 125, 137, 171, 71, 127
See application file for complete search history.

(56) References Cited

U.S. PATENT DOCUMENTS

| | | | | |
|---|---|---|---|---|
| 3,329,883 A * | 7/1967 | Frierdich | ........................ | 363/87 |
| 3,825,812 A * | 7/1974 | De Buhr | ........................ | 363/87 |
| 6,014,323 A | 1/2000 | Aiello et al. | | |
| 6,297,616 B1 * | 10/2001 | Kubo et al. | .................... | 320/116 |
| 7,430,132 B2 * | 9/2008 | Morishita | ........................ | 363/55 |
| 7,439,714 B2 * | 10/2008 | Llorente Gonzalez et al. | . | 322/24 |
| 7,471,011 B2 * | 12/2008 | Janssen | ............................ | 290/55 |
| 7,499,297 B2 * | 3/2009 | Stulz et al. | ........................ | 363/37 |
| 2010/0327793 A1 * | 12/2010 | Komulainen et al. | .......... | 318/503 |

OTHER PUBLICATIONS

"Toshiba Launches Active Front-End Versions of T300MVi & MTX NEMA 3R Medium Voltage Adjustable Speed Drives," Oct. 13, 2009, 1 page.
Mexican Office Action received in corresponding MX Application: MX/a/2011/007704, dated Feb. 19, 2013. Partial Translation.
Office Action in CA 2,745,664 dated Nov. 5, 2013.
Second Office Action in MX/a/2011/007704 dated Jul. 26, 2013.

\* cited by examiner

*Primary Examiner* — Matthew Nguyen
*Assistant Examiner* — Trinh Dang
(74) *Attorney, Agent, or Firm* — Banner & Witcoff, Ltd.

(57) ABSTRACT

A drive system for driving a multi-phase motor (such as a three-phase AC motor) or other load. Where a transformer is used, the transformer may have a disconnected wye configuration on the secondary side. The system may also utilize the average or other combination of DC bus voltages of inverters for each load phase, to provide feedback control.

22 Claims, 10 Drawing Sheets

MULTILEVEL REGENERATION DRIVE SYSTEM

BACKGROUND

The rotation speed of a three-phase alternating current (AC) motor depends upon the frequency of the AC signal input into the motor. Where it is desirable to control the speed of such a motor, a driver circuit is commonly used to convert the original AC power source signal (which is typically fixed) to a desired driving frequency and/or voltage. The driver circuit may also include a regeneration capability, which receives energy back from the motor, such as when the motor winds down or resists an external force attempting to increase the speed of the motor beyond a controlled speed.

Such driver circuits typically include a pair of three-phase inverters, one for driving the motor and the other for performing the regeneration function. Where a transformer is used between the power source and the driver circuit to obtain a higher drive voltage, then there is typically one three-phase converter and one single-phase inverter for each motor phase. Moreover, the transformer will include multiple secondary isolation windings. The end result is often a complex and costly system, utilizing many devices and voltage/current detection circuits.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Some aspects as described herein are directed to, for example, an improved drive system for driving a multi-phase motor (such as a three-phase AC motor) or other multi-phase load. Where a transformer is used, the transformer may have a disconnected wye configuration on the secondary side, which may simplify the system as compared with conventional systems. Moreover, this may allow for an improved control portion of the system that utilizes the average or other combination of DC bus voltages of inverters for each load phase, to provide feedback control of the load.

According to some aspects, an example apparatus is described, comprising a transformer comprising a set of primary windings, and first, second, and third secondary windings, wherein the first, second, and third secondary windings are not electrically tied together at a common potential node; a first converter configured to generate a voltage at a first DC bus based on a voltage across the first secondary winding; a second converter configured to generate a voltage at a second DC bus based on a voltage across the second secondary winding; and a third converter configured to generate a voltage at a third DC bus based on a voltage across the third secondary winding.

According to further aspects, an example apparatus configured to be coupled to a three-phase power supply is described. The apparatus comprises a first converter comprising a first input node and a second input node, the first input node of the first converter configured to generate a voltage at a first DC bus based on a first phase of the three-phase power supply; a second converter comprising a first input node and a second input node, the first input node of the second converter configured to generate a voltage at a second DC bus based on a second phase of the three-phase power supply; and a third converter comprising a first input node and a second input node, the first input node of the third converter configured to generate a voltage at a third DC bus based on a third phase of the three-phase power supply, wherein the second nodes of the first, second, and third converters are electrically tied together.

According to still further aspects, an example apparatus is described, comprising a transformer comprising first, second, and third primary windings in a connected wye or delta configuration, and first, second, and third secondary windings in a disconnected wye configuration; a first converter configured to generate a first voltage by rectifying a voltage across the first secondary winding; a second converter configured to generate a second voltage by rectifying a voltage across the second secondary winding; and a third converter configured to generate a third voltage by rectifying a voltage across the third secondary winding.

These and other aspects of the disclosure will be apparent, as discussed in greater detail below.

Figure 1:
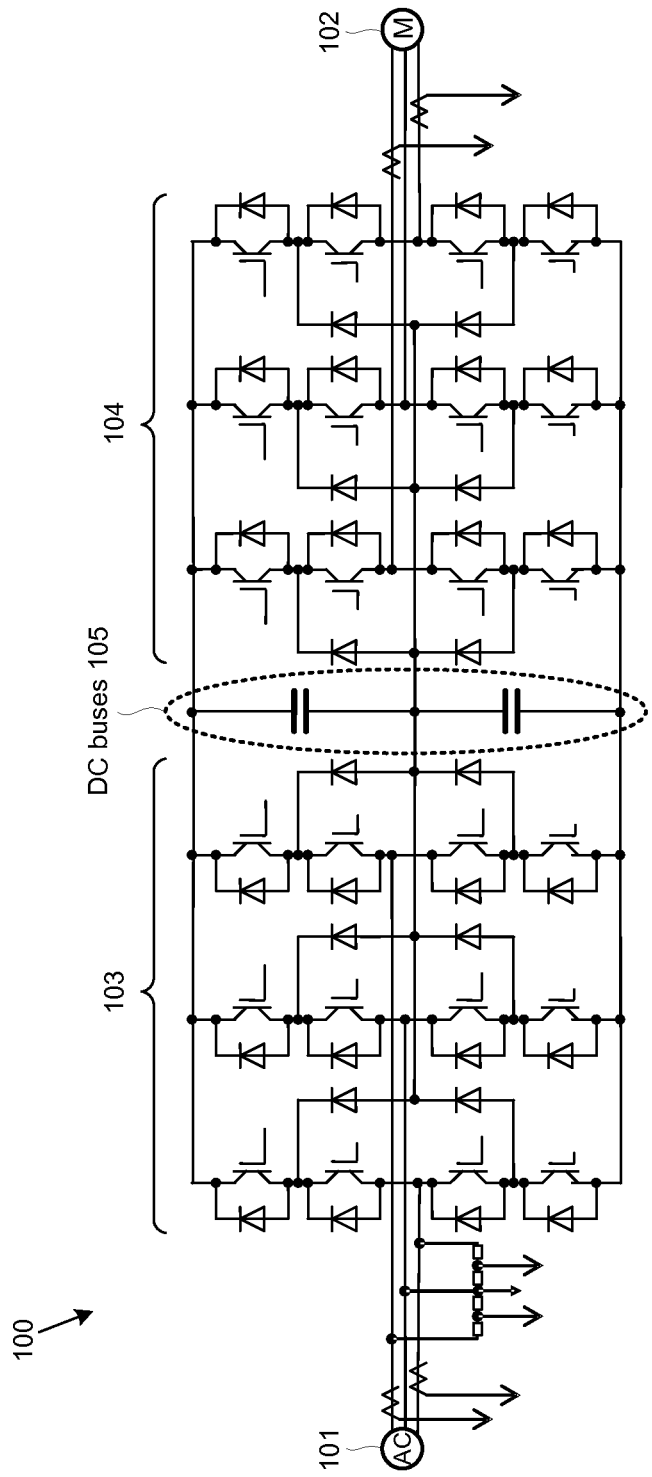
FIG. 1 is a schematic diagram of a conventional lower-voltage three-phase motor drive system using a regenerative three-phase converter/inverter set and a shared DC bus for all three motor phases.

FIG. 1 is a schematic diagram of a conventional motor drive system 100 using a regenerative three-phase converter/inverter and a shared DC bus for all three motor phases. In this embodiment, system 100 includes a source 101 coupled to a regenerative converter 103 and an inverter 104 for driving a motor 102 and for providing an energy regeneration function. In this embodiment, regenerative converter 103 is used to control a DC voltage, and inverter 104 is used to control the speed of motor 102. Inverter 104 provides rotational energy forward to motor 102 and/or receives regenerative energy back from motor 102, which may be fed back to source 101. This system 100 has one or more DC buses 105. The design and operation of converter 103 and inverter 104, each of which in this example includes a plurality of controllable switches, such as insulated gate bipolar transistors (IGBTs) or metal-oxide-semiconductor field-effect transistors (MOSFETs), is well known.

Figure 2:
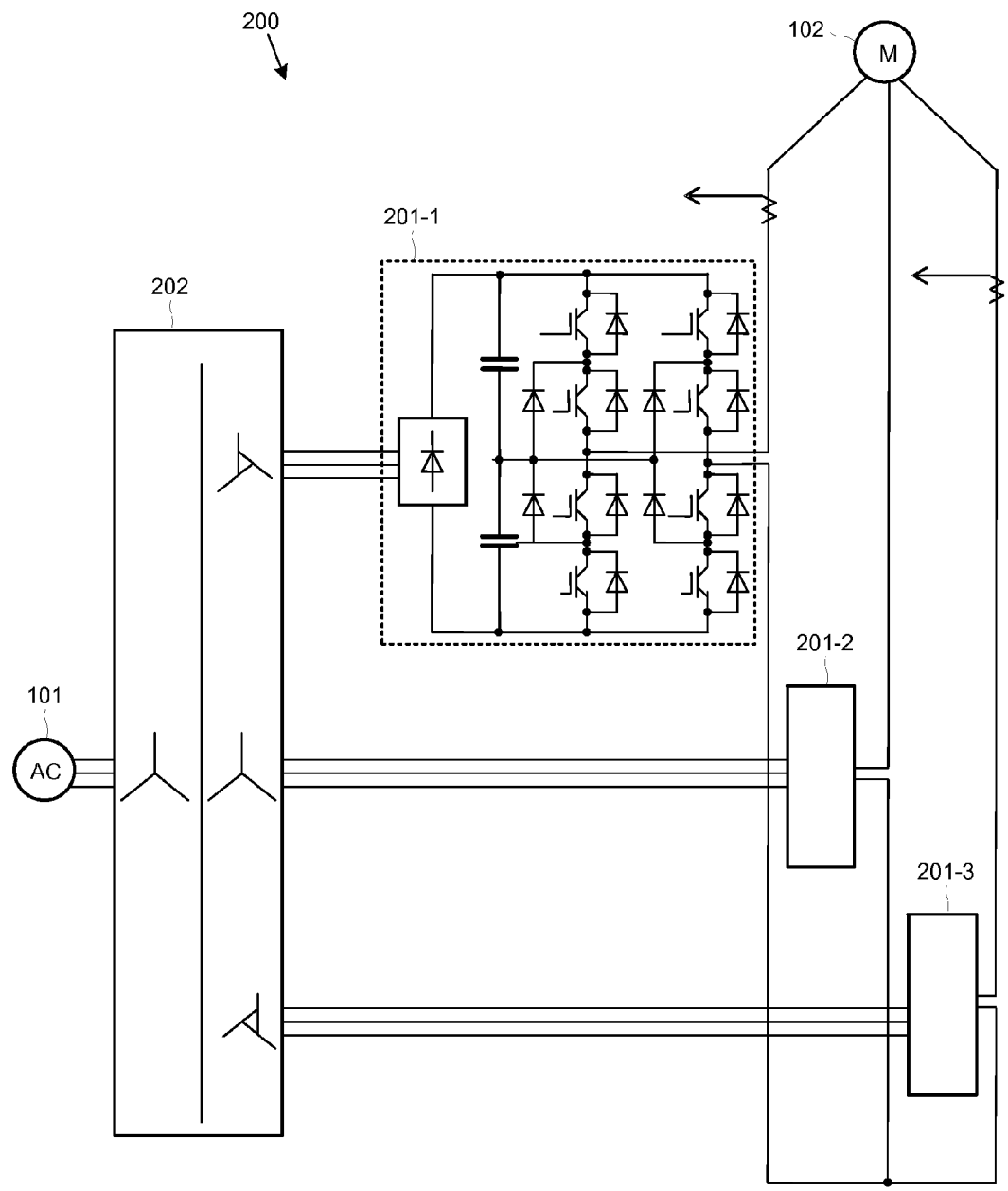
FIG. 2 is a schematic diagram of a conventional higher-voltage motor drive system using a set of three-phase rectifiers and single-phase inverters on each motor phase.
Figure 10:
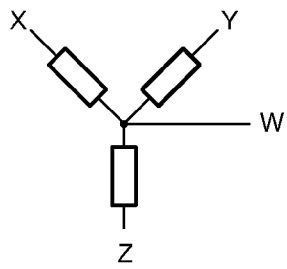
FIG. 10 is a schematic diagram of an example connected wye configuration.
Figure 11:
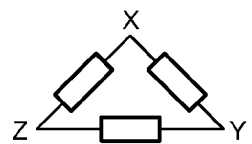
FIG. 11 is a schematic diagram of an example delta configuration.

FIG. 2 is a schematic diagram of a conventional motor drive system 200 using a set of three-phase rectifiers and single-phase inverters on each motor phase and which typically (but not necessarily) operates at a higher source voltage and/or drive voltage than system 100. System 200 includes a transformer 202 that receives the three phases of source 101 into a conventional connected wye-configured input side and outputs to the three sets of single-phase inverters with three different phase shifts. At a first output of transformer 202, three extended delta-connected phases are output, at a second output of transformer 202, three connected wye phases are output, and at a third output of transformer 202, three extended delta-connected phases are output, which is a typical configuration used for reducing input harmonics. An example showing nodes X, Y, and Z in a connected wye configuration is shown in FIG. 10 (where the common node connecting the three legs of the wye configuration is labeled "W"), and an example showing nodes X, Y, and Z in a delta configuration is shown in FIG. 11.

Figure 3:
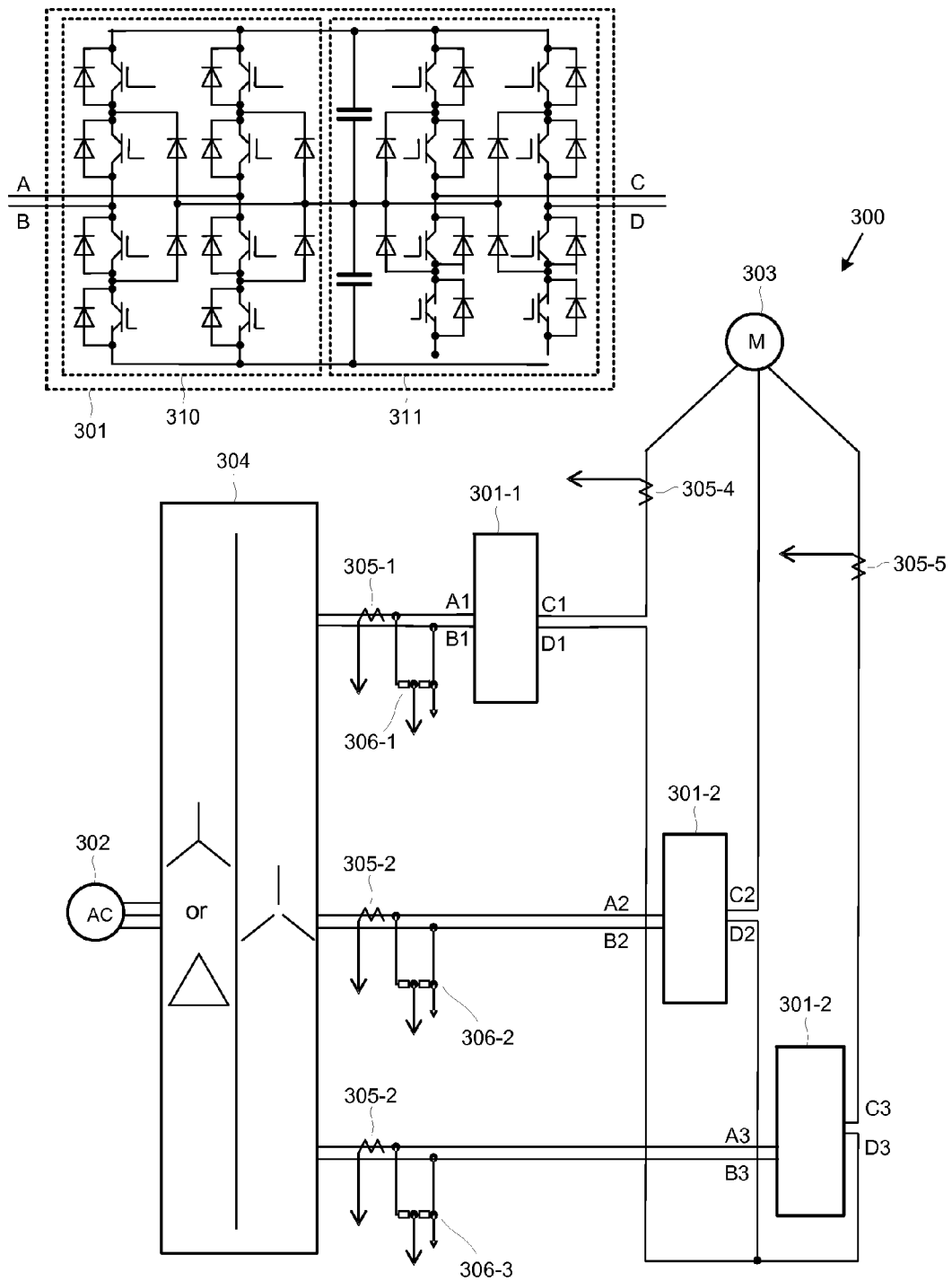
FIG. 3 is a schematic diagram of an example motor drive system having a transformer and using a regenerative single-phase converter/inverter set for each motor phase.

FIG. 3 is a schematic diagram of an example motor drive system 300 that may be a higher-voltage system, in which each motor phase is coupled to a different regenerative single-phase converter/inverter pair 301-1, 301-2, 301-3 (collectively referred to as 301), where each converter/inverter pair 301 for a given motor phase includes a pair of single-phase inverters 310, 311. Converter/inverter pair 301 is shown in this example as having a three-level architecture. However, converter/inverter pair 301 may alternatively have a two-, four-, or even higher-level architecture. For each motor phase, inverter 310 functions as a regenerative converter and the inverter 311 functions as an inverter. And, for each motor phase, the respective inverter 311 is coupled to an isolated DC bus of the associated converter 310. This may allow the single-phase outputs of regeneration converters 310 to be coupled to a three-phase source 302 via a relatively simpler single open secondary transformer 304, as will be further discussed below.

Each converter/inverter pair 301 has four electrical nodes: A, B, C, and D. For example, for one motor phase, the four nodes are A1, B1, C1, and D1, for another motor phase, the four nodes are A2, B2, C2, and D2, and for the third motor phase, the four nodes are A3, B3, C3, and D3. The naming of the various nodes is merely for purposes of explanation, and the particular names chosen have no special significance.

Figure 12:
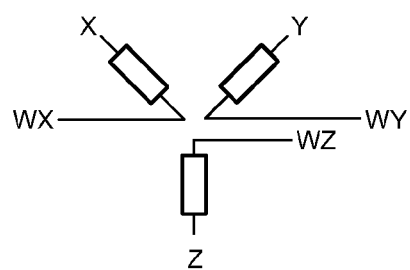
FIG. 12 is a schematic diagram of an example disconnected wye configuration.

In the example of FIG. 3, the primary side of transformer 304 (i.e., the side coupled closest to source 302) is configured as a wye-connected three-phase input. Alternatively, the primary side of transformer 304 may be configured as a delta-connected three-phase input. The secondary side of transformer 304 (i.e., the side coupled closest to nodes A and B of each motor phase) is configured as a "disconnected" wye-connected three-phase output, in which the neutral point, which would otherwise tie together the three phases in a conventional wye connection, is not tied together. The disconnected wye configuration is symbolically illustrated in the figures herein as a wye symbol except that the central connection point is removed. An example showing nodes X, Y, and Z in a disconnected wye configuration is shown in FIG. 12. As can be seen, there is no single common node for the three legs of this configuration. Instead, one leg runs between nodes X and WX, another runs between nodes Y and WY, and the third leg runs between nodes Z and WZ. Nodes WX, WY, and WZ float with respect to each other.

System 300 in this example further includes a current-measuring device 305-1, 305-2, 305-3 for measuring the instantaneous current through node A for each secondary transformer phase and a current-measuring device 305-4, 305-5 for measuring the instantaneous currents through two of the motor phases. The current-measuring devices may each be, for example, a Hall-Effect current transducer (HCT). System 300 further includes a voltage-measuring device 306-1, 306-2, 306-3 for measuring the instantaneous voltage difference between nodes A and B for each secondary transformer phase. The voltage-measuring devices may each be implemented as or otherwise include, for example, a voltage divider.

Figure 4:
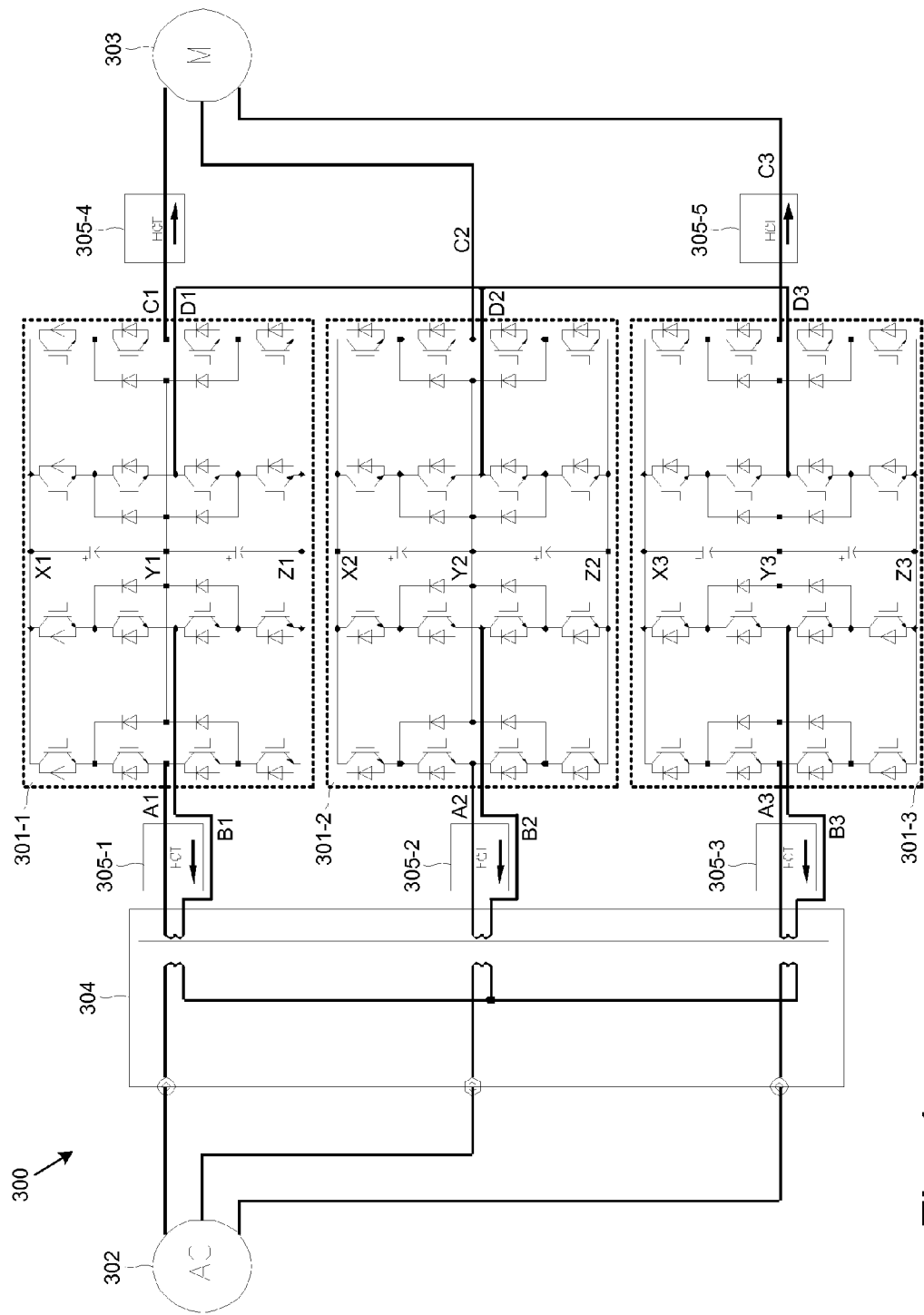
FIG. 4 is another schematic diagram of the embodiment of FIG. 3, showing different details.

FIG. 4 shows system 300 at a different level of detail. For example, further detail is shown for transformer 304. As can be seen, a conventional connected wye connection in this example may be provided on the primary side of transformer 304. An example of how the disconnected wye connection on the secondary side of transformer 304 may be implemented is also shown. For instance, on the secondary side of transformer 304, each pair of nodes A and B may be independently coupled together through a secondary coil, without necessarily being coupled to any of the other A/B pairs of nodes driving the other two phases of motor 303. In this example, the secondary winding between nodes A1 and B1 is inductively coupled to only the top shown primary winding, the secondary winding between nodes A2 and B2 is inductively coupled to only the middle shown primary winding, and the secondary winding between nodes A3 and B3 is inductively coupled to only the bottom shown primary winding.

Figure 5:
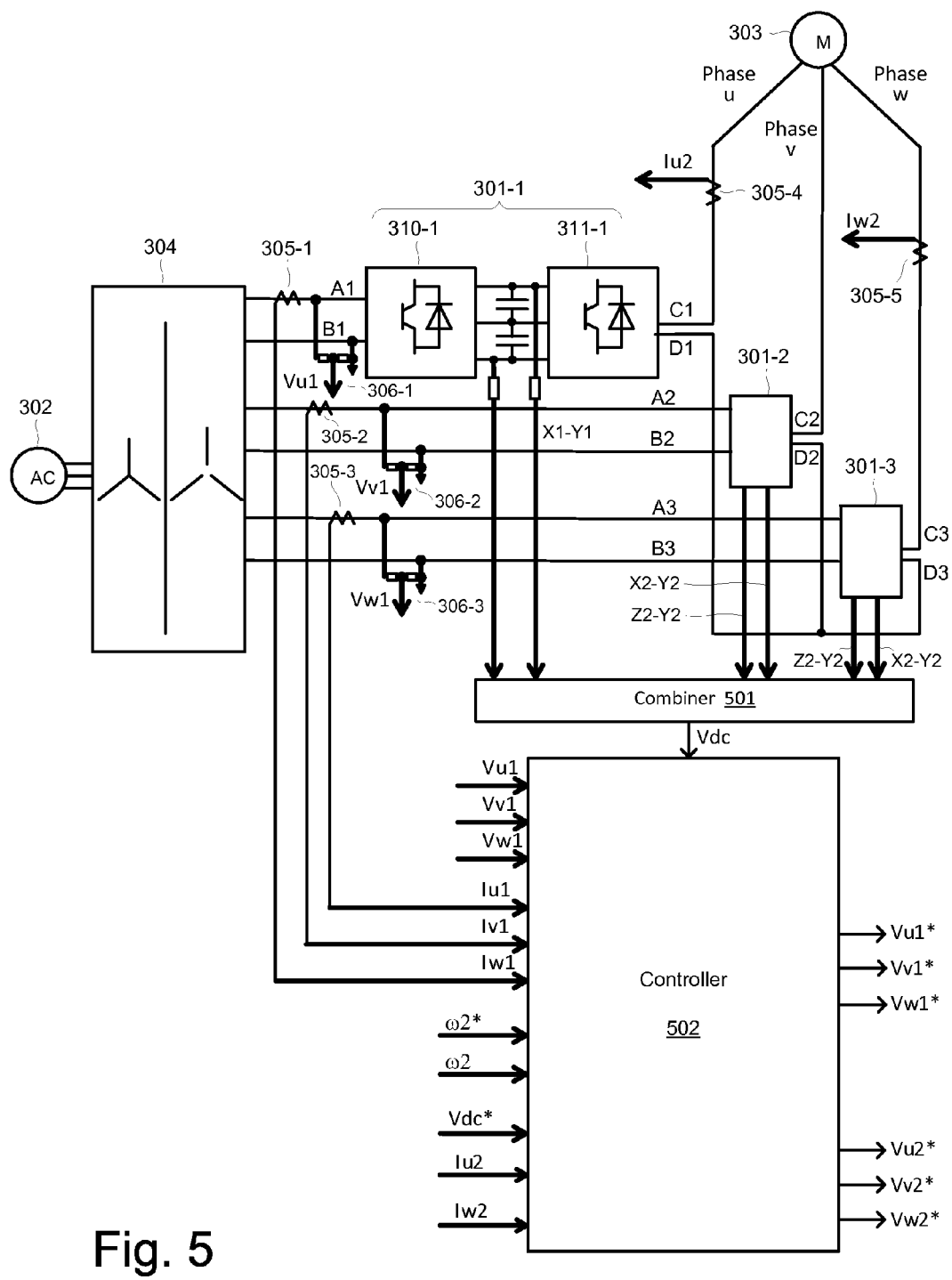
FIG. 5 is a schematic diagram of the example motor drive system of FIG. 3, and further including an example DC bus voltage combiner and an example controller providing drive feedback.

Also shown in both FIGS. 4 and 5 are arbitrary labels of various nodes of the DC buses for each converter/inverter pair 301. In this example, nodes X1-X3, Y-Y3, and Z1-Z3 are shown in one or both of these figures, and are merely included for purposes of explanation below with regard to FIG. 5. Thus, the various DC buses in this embodiment include DC bus X1-Y1, DC bus Z1-Y1, DC bus X2-Y2, DC bus Z2-Y2, DC bus X3-Y3, and DC bus Z3-Y3.

FIG. 5 is a schematic diagram of system 300, and further including an example three-phase DC bus voltage combiner 501 and an example controller 502. In this example, the three motor phases are labeled as u, v, and w. Controller 502 may read feedback signals from converter modules 310, inverter modules 311, and current and voltage sensing devices 305 and 306. Based on these feedback signals, controller 502 may provide gate signals for dynamically controlling the on/off states of the various switching devices (e.g., transistors) in the converter and inverter modules 310 and 311. Combiner 501 may receive, as inputs, the voltages of the various DC buses. In this example, the inputs to combiner 501 may be or otherwise depend on the voltages across DC buses X1-Y1, X2-Y2 X3-Y3, Z1-Y1, Z2-Y2, and Z3-Y3, or a subset thereof. The output of combiner 501 may be one or more output voltages that depend upon the input voltages. In the present example, the output voltage from combiner 501 is labeled as Vdc.

The output voltage Vdc of combiner 501 may depend on the input voltages in any way desired. In some examples, voltage Vdc is or otherwise depends on the average of the input voltages. The average may be weighted or unweighted. For instance, Vdc may equal or otherwise depend on (X1+Z1+X2+Z2+X3+Z3)/6, where X1 is shorthand for the voltage across DC bus X1-Y1; Z1 is shorthand for the voltage across DC bus Z1-Y1; X2 is shorthand for the voltage across DC bus X2-Y2; Z2 is shorthand for the voltage across DC bus Z2-Y2; X3 is shorthand for the voltage across DC bus X3-Y3; and Z3 is shorthand for the voltage across DC bus Z3-Y3. As another example, Vdc may equal $C*(K1*X1+L1*Z1+K2*X2+L2*Z2+K3*X3+L3*Z3)/6$, where each of C, K1-K3, and L1-L3 is a predetermined constant of any value. The values of C, K1-K3, and L1-L3 may be equal to or different from each other, may each be less than one, equal to one, or greater than one, and may be positive or negative. Moreover, the combination (e.g., average) may be an instantaneous combination that takes into account only present values of the DC bus voltages, or it may be a combination that also takes into account past values of the DC bus voltages such as those occurring within a sliding time window. Thus, where a sliding window average is used, Vdc may be expressed as, e.g.:

$$\frac{1}{6T}\sum_{i=n}^{n+T}(K1(i)X1(i)+L1(i)Z1(i)+$$
$$K2(i)X2(i)+L2(i)Z2(i)+K3(i)X3(i)+L3(i)Z3(i))$$

where i is a time index value, n is the beginning value of index i of the sliding window at a given moment, and T is the width of the sliding window.

Figure 6:
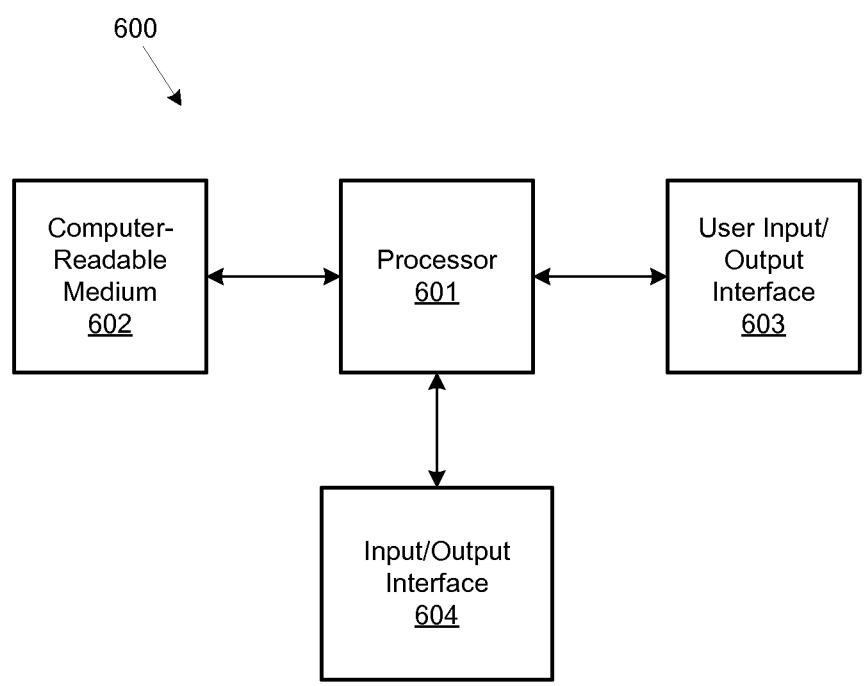
FIG. 6 is an example functional block diagram of a computer.

Combiner 501 and controller 502 may be implemented using dedicated circuitry and/or a computer, and may be separate units from each other or embodied as a single integrated unit. Where a computer is used, the computer may execute software to perform the functions of combiner 501 and/or controller 502. For example, FIG. 6 is a functional block diagram of an example computer 600 that may be used to implement combiner 501 and/or controller 502, which may include hardware that may execute software to perform specific functions. The software, if any, may be stored on a computer-readable medium 602 in the form of computer-readable instructions. Computer 600 may read those computer-readable instructions, and in response perform various steps as defined by those computer-readable instructions. Thus, any functions attributed to the example combiner 501 and/or controller 502 as described herein may be implemented, for example, by reading and executing such computer-readable instructions for performing those functions, and/or by any hardware subsystem (e.g., a processor 601) from which computer 600 is composed. Additionally or alternatively, any of the above-mentioned functions may be implemented by the hardware of computer 600, with or without the execution of software. For example, computer 600 may be or include one or more microprocessors, central processing units (CPUs), and/or other types of circuitry configured to perform some or all of the functions attributed to computer 600. In such embodiments, processor 601 may be implemented as or otherwise include the one or more microprocessors, CPUs, and/or other types of circuitry.

A computer may include any electronic, electro-optical, and/or mechanical device, or system of multiple physically separate or integrated such devices, that is able to process and manipulate information, such as in the form of data. Non-limiting examples of a computer include one or more personal computers (e.g., desktop, tablet, handheld, or laptop), mainframes, servers, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

Computer-readable medium 602 may include not only a single physical intransient medium or single type of such medium, but also a combination of one or more such media and/or types of such media. Examples of embodiments of computer-readable medium 602 include, but are not limited to, one or more memories, hard drives, optical discs (such as CDs or DVDs), magnetic discs, and magnetic tape drives.

Computer-readable medium 602 may be physically part of, or otherwise accessible by, computer 600, and may store computer-readable instructions (e.g., software) and/or computer-readable data (i.e., information that may or may not be executable).

Computer 600 may also include a user input/output interface 603 for receiving input from a user (e.g., via a keyboard, mouse, and/or remote control) and providing output to the user (e.g., via a display device, an audio speaker, and/or a printer). Computer 600 may further include an input/output interface 604 for physically communicating signals (e.g., voltages, currents, and/or data) with devices external to computer 600. For example, the bus voltages may be input by input/output interface 604 of combiner 501, and voltage Vdc may be output by input/output interface 604 of combiner 501. Likewise, any inputs to controller 502 including voltage Vdc may be input by input/output interface 604 of controller 502, and any outputs from controller 502 may be output by input/output interface 604 of controller 502.

Referring again to FIG. 5, controller 502 in this example may receive inputs and provide outputs as described below in Tables 1 and 2.

TABLE 1

| Inputs to Controller 502 | |
|---|---|
| signal | description |
| Vu1 | voltage measured between A1 and B1 |
| Vv1 | voltage measured between A2 and B2 |
| Vw1 | voltage measured between A3 and B3 |
| Iu1 | current measured through A1 |
| Iv1 | current measured through A2 |
| Iw1 | current measured through A3 |
| ω2 | measured or estimated angular velocity of motor |
| ω2* | desired value of ω2 |
| Vdc | output voltage of combiner 501 |
| Vdc* | desired value of Vdc |
| Iu2 | current measured through C1 |
| Iw2 | current measured through C3 |

TABLE 2

| Outputs From Controller 502 | |
|---|---|
| signal | description |
| Vu1* | output voltage reference for module 310-1 |
| Vv1* | output voltage reference for module 310-2 |
| Vw1* | output voltage reference for module 310-3 |
| Vu2* | output voltage reference for module 311-1 |
| Vv2* | output voltage reference for module 311-2 |
| Vw2* | output voltage reference for module 311-3 |

The operation of controllers that receive all of the inputs of Table 1 except Vdc and Vdc* are generally known, as are controllers that produce the outputs of Table 2. In this example, controller 502 is further configured to take into account inputs Vdc and Vdc*, as will be described in further detail with reference to FIG. 7.

Figure 7:
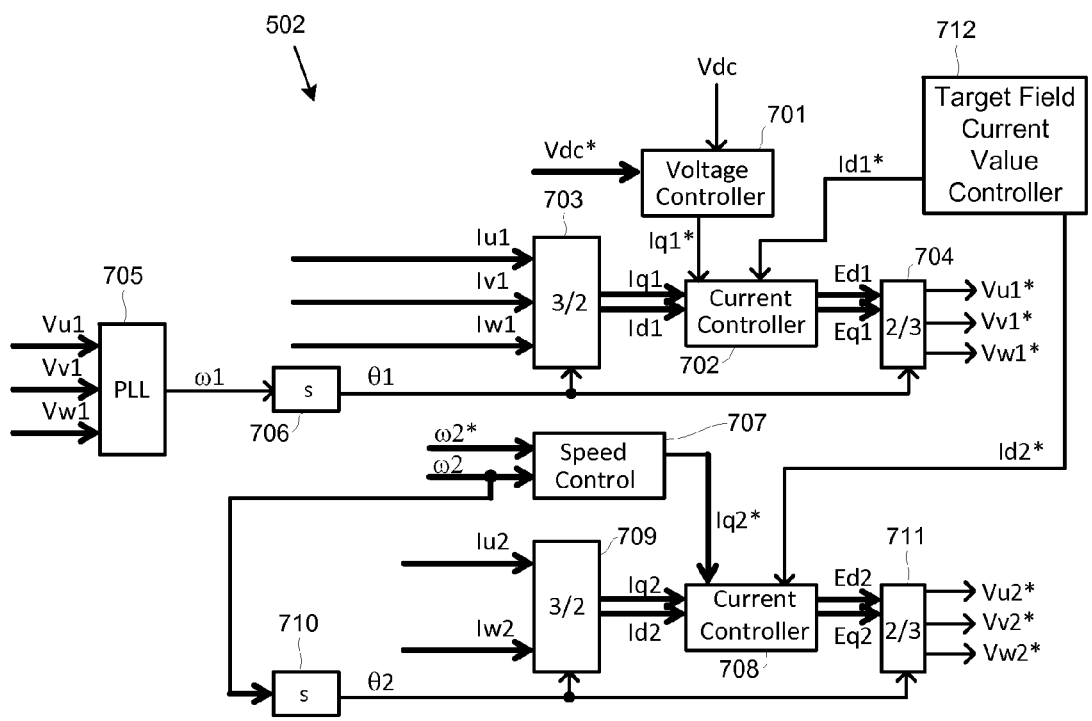
FIG. 7 is a schematic diagram showing example details of the controller of FIG. 5.

FIG. 7 shows an example functional block diagram of controller 502. In this example, controller 502 includes a voltage controller 701, a current controller 702, a three-to-two phase converter 703, a two-to-three phase converter 704, a phase-locked loop (PLL) circuit 705, an angular-velocity-to-angular-position converter 706 a speed control circuit 707, a current controller 708, a three-to-two phase converter 709, an angular-velocity-to-angular-position converter 710, and a two-to-three-phase converter 711. Each of these elements 701-711 are individually well-known, and so details of how these elements operate need not be described herein.

As discussed previously, Vdc may represent a combination (e.g., an average) of the DC bus voltages associated with the three motor phases. Voltage controller 701 compares Vdc with a desired, or target, value of Vdc, referred to as Vdc*, and generates an internal signal Iq1*, representing a target torque current, as a result of the comparison.

Converter 703 receives signals Iu1, Iv1, and Iw1, which represent the actual currents measured at the three phases, and converts them to the following two phase signals: actual torque current Iq1 and actual field current Id1. Also, PLL 705 generates an internal signal ω1 based on signals Vu1, Vv1, and Vw1. Converter 706 generates another internal signal, θ1, which represents an angular position, based on signal ω1.

Signal Id1* as shown in FIG. 7 represents a target field current, and may be set to a fixed value, such as zero, and/or may be set by a target field current value controller 712, such as a volt-ampere reactive (VAR) controller or a power factor controller. Current controller 702 receives the Id1*, Iq1*, Iq1, and Id1 signals, and based on these received signals, outputs the following two internal signals: field voltage reference Ed1 and torque voltage reference Eq1. Then, converter 704 generates the three output phase signals Vu1*, Vv1*, and Vw1* based on Ed1, Eq1, and θ1. Signals Vu1*, Vv1*, and Vw1* indirectly control the on/off states of transistors of module 310 for the respective motor phases u, v, and w.

In parallel with the above processing, speed control 707 generates an internal target torque current signal Iq2* based on signals ω2 and ω2*, which is fed into current controller 708. Converter 709 receives signals Iu2 and Iw2. Because the wye point is connected in the inverter side, signals Iu2 and Iw2 together represent all three phases of current, wherein the v-phase v current Iv is equal to −(Iu+Iw). Converter 703 converts Iu2 and Iw2 to the following two phase signals: actual torque current Iq2 and actual field current Id2. This may provide the same result as having three current sensors providing the Iu, Iv, and Iw currents. Also, converter 710 generates another internal signal, θ2, which represents an angular position, based on signal ω.

Target field current signal Id2* as shown in FIG. 7 may be set to a fixed value, such as that representing a no-load motor current, and/or may be set by target field current value controller 712. Current controller 707 receives the Iq2*, Id2*, Iq2, and Id2 signals, and based on these received signals, outputs the following two internal signals: field voltage reference Ed2 and torque voltage reference Eq2. Then, converter 711 generates the three output phase signals Vu2*, Vv2*, and Vw2* based on Ed2, Eq2, and θ2. Signals Vu2*, Vv2*, and Vw2* indirectly control the on/off states of transistors of module 311 for the respective motor phases u, v, and w.

As mentioned above, controller 502 provides some or all of signals Vu1*, Vv1*, Vw1*, Vu2*, Vv2*, and/or Vw2*, which control the various transistors of the converter/inverter pairs 301. For example, each of signals Vu1*, Vv1*, Vw1*, Vu2*, Vv2*, and Vw2* may be forwarded to a pulse-width modulation (PWM) controller that generates gate control pulses, based on these received signals, to control each of the individual transistors in modules 310 and 311. In particular, Vu1*, Vv1*, and Vw1* may be used by the PWM controller to control the transistors of modules 310, and Vu2*, Vv2*, and Vw2* may be used by the PWM controller to control the transistors of modules 311. In this way, motor 303 may be controlled based on the combined (e.g., averaged) voltages of the DC buses associated with the three motor phases u, v, and w.

Figure 8:
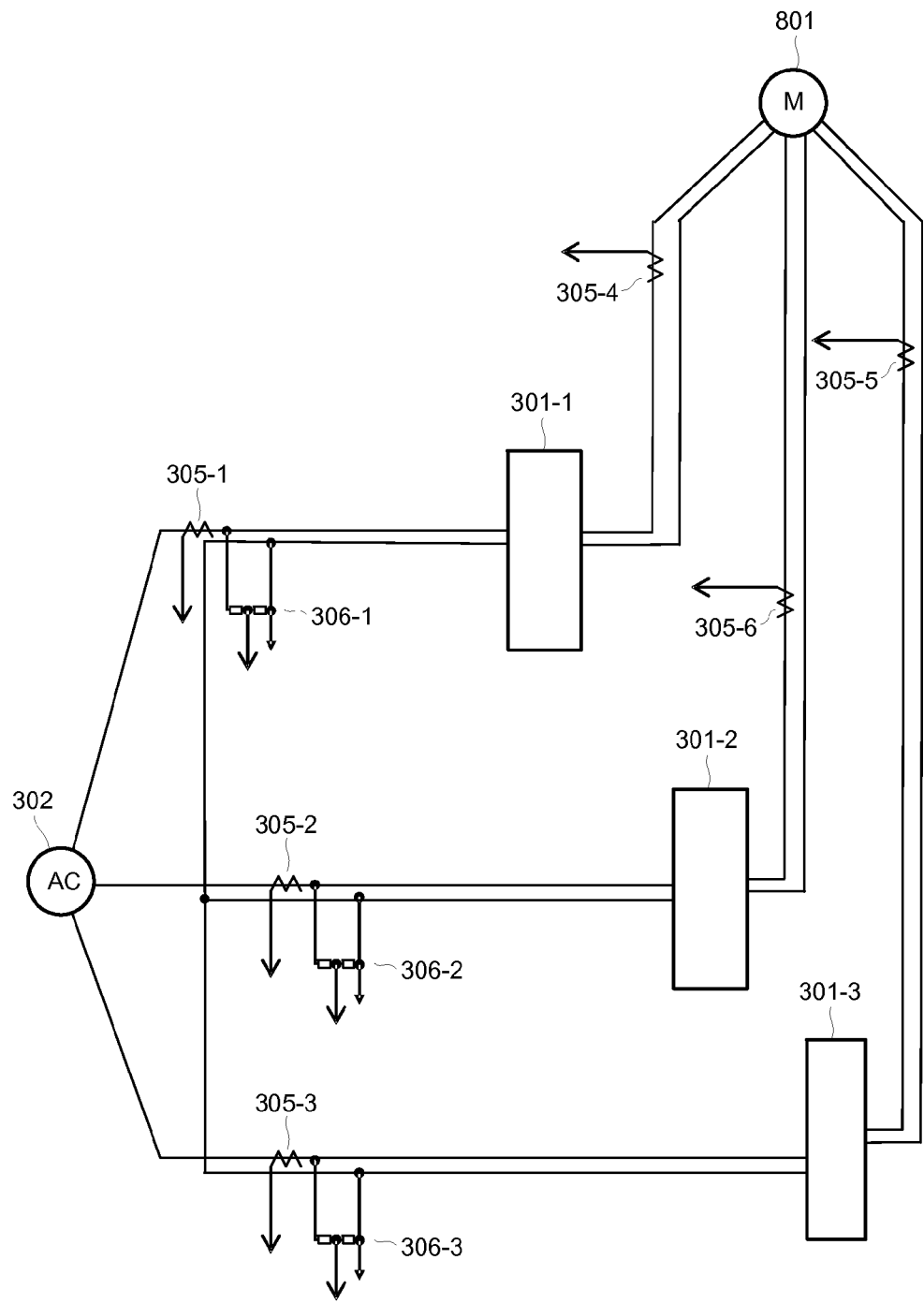
FIG. 8 is a schematic diagram of an example transformerless motor drive system for driving an open-winding motor.

In previously-described embodiments, the motor has been shown by way of example as a close-winding motor. However, an open-winding motor, which does not have a shared neutral point for all three phases, may alternatively be used. For example, FIG. 8 is a schematic diagram of an example motor drive system for driving such an open-winding motor 801. Because of the open-winding configuration, input transformer 304 may be entirely eliminated, if desired. And, in this embodiment, three motor current sensors 305-4, 305-5, 305-6 (one for each phase) are used, because of the possibility of a zero phase current. Moreover, this open-winding configuration may be used with or without a regenerative inverter for each phase. Combiner 501 and controller 502 may also be used in the embodiment of FIG. 8.

Figure 9:
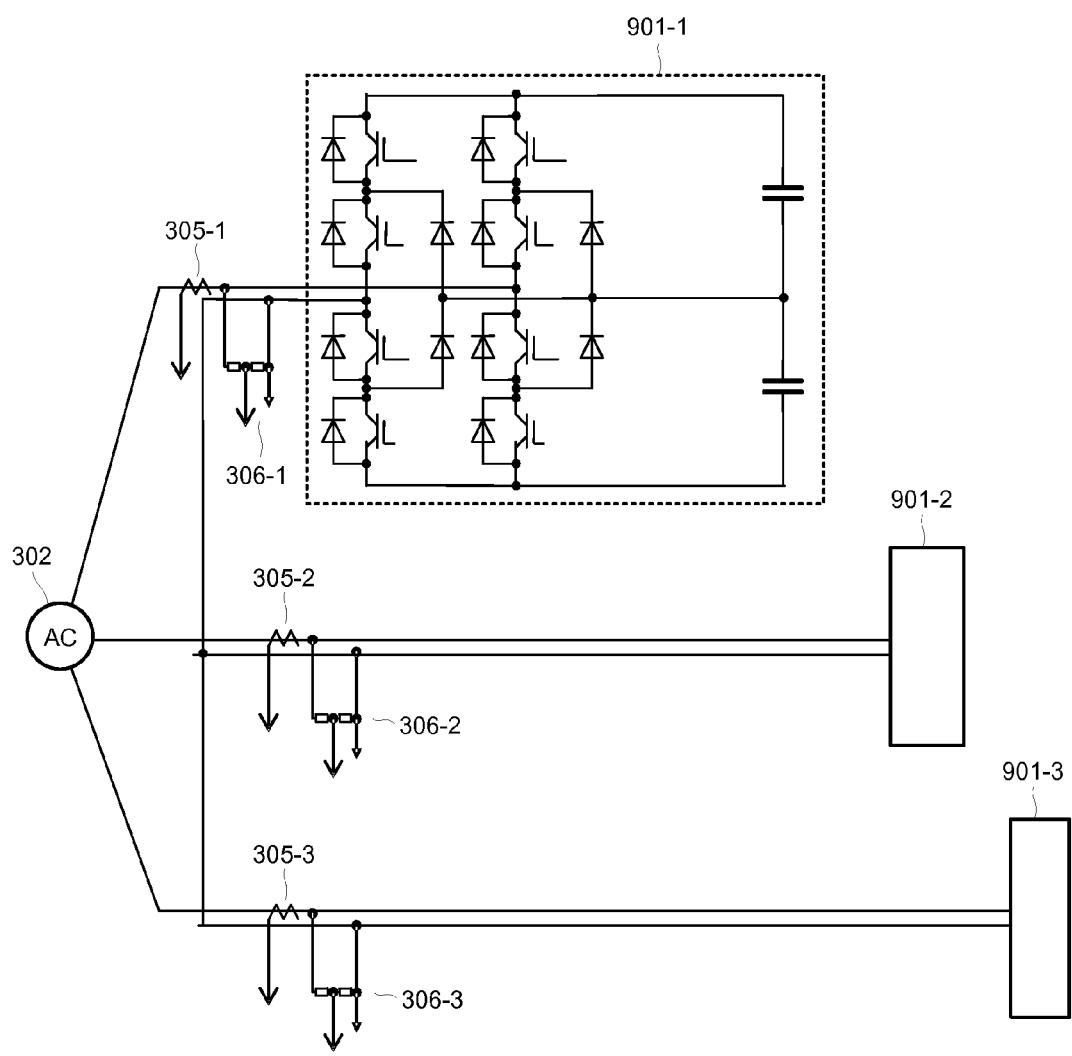
FIG. 9 is a schematic diagram of an example static volt-ampere reactive (VAR) compensator that may be used to control the power factor of a system.

Aspects as described herein may also be used in environments other than controlling a motor. For example, FIG. 9 is a schematic diagram of an example static volt-ampere reactive (VAR) compensator that may be used to control the power factor of a system such as an industrial plant. In the example of FIG. 9, the VAR compensator includes a regenerative converter 901 for each phase, but without also including an inverter for each phase as in previous example embodiments. Again, combiner 501 and controller 502 may also be used in the embodiment of FIG. 9.

Thus, various examples of an improved motor drive system and method have been described. While certain embodiments of the present invention have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. For example, while a three-phase system has been described, the invention may be used in connection with a multi-phase system having any number of phases, such as two, three, four, or more phases. The accompanying claims and their equivalents are intended to cover such forms or modifications as would fall within the scope and spirit of the inventions.

The invention claimed is:

1. An apparatus, comprising:
   a transformer comprising three phases of primary windings, and first, second, and third secondary windings each inductively coupled to a different phase of the three phases of primary windings, wherein the first, second, and third secondary windings are not electrically tied together at a common potential node;
   a first converter configured to generate a voltage at a first DC bus based on a voltage across the first secondary winding;
   a second converter configured to generate a voltage at a second DC bus based on a voltage across the second secondary winding;
   a third converter configured to generate a voltage at a third DC bus based on a voltage across the third secondary winding, wherein the first, second and third converters are coupled to first, second and third input phases, respectively, of a three-phase load; and
   a combiner configured to generate a voltage based on the voltages at the first, second, and third DC buses.

2. The apparatus of claim 1, wherein the first, second, and third primary windings are electrically tied together at a first node, and wherein the first secondary winding is inductively coupled to the first primary winding, the second secondary winding is inductively coupled to the second primary winding, and third secondary winding is inductively coupled to the third primary winding.

3. The apparatus of claim 1, wherein:
the first converter is configured to generate a voltage at a fourth DC bus based on the voltage across the first secondary winding,
the second converter is configured to generate a voltage at a fifth DC bus based on the voltage across the second secondary winding,
the third converter is configured to generate a voltage at a sixth DC bus based on the voltage across the third secondary winding, and
the combiner is configured to generate the voltage based on an average of the voltages at the first, second, third, fourth, fifth, and sixth DC buses.

4. The apparatus of claim 1, wherein each of the first, second, and third converters is a single-phase converter.

5. The apparatus of claim 1, further comprising:
a first inverter coupled to the first DC bus;
a second inverter coupled to the second DC bus; and
a third inverter coupled to the third DC bus.

6. The apparatus of claim 5, wherein the three-phase load is a motor having a first phase input coupled to the first inverter, a second phase input coupled to the second inverter, and a third phase input coupled to the third inverter.

7. The apparatus of claim 5, wherein:
the first converter comprises a fourth inverter,
the second converter comprises a fifth inverter, and
the third converter comprises a sixth inverter.

8. The apparatus of claim 7, wherein the first, second, third, fourth, fifth, and sixth inverters are each electrically coupled between one of the secondary windings and the three-phase load.

9. The apparatus of claim 1, further comprising a controller configured to control the first, second, and third converters based on the voltage generated by the combiner.

10. The apparatus of claim 9, wherein the controller comprises the combiner.

11. An apparatus configured to be coupled to a three-phase power supply, the apparatus comprising:
a first converter comprising a first input node and a second input node, the first input node of the first converter configured to generate a voltage at a first DC bus based on a first phase of the three-phase power supply;
a second converter comprising a first input node and a second input node, the first input node of the second converter configured to generate a voltage at a second DC bus based on a second phase of the three-phase power supply;
a third converter comprising a first input node and a second input node, the first input node of the third converter configured to generate a voltage at a third DC bus based on a third phase of the three-phase power supply; and
a controller configured to control the first, second, and third converters based on an average of voltages between the first and second nodes of the first, second and third converters,
wherein the second nodes of the first, second, and third converters are electrically tied together.

12. The apparatus of claim 11, wherein the average is a weighted average.

13. The apparatus of claim 11, wherein:
the first converter is configured to generate a voltage at a fourth DC bus based on the first phase of the three-phase power supply,
the second converter is configured to generate a voltage at a fifth DC bus based on the second phase of the three-phase power supply,
the third converter is configured to generate a voltage at a sixth DC bus based on the third phase of the three-phase power supply, and
the controller is configured to control the first, second, and third converters based on an average of the voltages at the first, second, third, fourth, fifth, and sixth DC buses.

14. The apparatus of claim 11, wherein:
the first converter is a single-phase converter and the first node of the first converter is coupled to the first phase,
the second converter is a single-phase converter and the first node of the second converter is coupled to the second phase, and
the third converter is a single-phase converter and the first node of the third converter is coupled to the third phase.

15. The apparatus of claim 11, further comprising:
a first inverter coupled to the first DC bus;
a second inverter coupled to the second DC bus; and
a third inverter coupled to the third DC bus.

16. The apparatus of claim 15, further comprising a motor having a first phase input coupled to the first inverter, a second phase input coupled to the second inverter, and a third phase input coupled to the third inverter.

17. An apparatus, comprising:
a transformer comprising first, second, and third primary windings in a connected wye configuration, and first, second, and third secondary windings in a disconnected wye configuration;
a first converter configured to generate a first voltage by rectifying a voltage across the first secondary winding;
a second converter configured to generate a second voltage by rectifying a voltage across the second secondary winding; and
a third converter configured to generate a third voltage by rectifying a voltage across the third secondary winding, wherein the first, second and third converters are coupled to first, second and third input phases, respectively, of a three-phase load,
wherein:
the first converter is further configured to generate a fourth voltage by rectifying the voltage across the first secondary winding,
the second converter is further configured to generate a fifth voltage by rectifying the voltage across the second secondary winding,
the third converter is further configured to generate a sixth voltage by rectifying the voltage across the third secondary winding, and
the apparatus further comprises a combiner configured to generate a seventh voltage based on an average of the first, second, third, fourth, fifth, and sixth voltages.

18. The apparatus of claim 17, wherein the average is a weighted average.

19. The apparatus of claim 17, further comprising a controller configured to control the first, second, and third converters based on the seventh voltage.

20. An apparatus, comprising:
a transformer comprising first, second, and third primary windings in a delta configuration, and first, second, and third secondary windings in a disconnected wye configuration;

a first converter configured to generate a first voltage by rectifying a voltage across the first secondary winding based on a first phase voltage from a three-phase source;

a second converter configured to generate a second voltage by rectifying a voltage across the second secondary winding, based on a second phase voltage from the three-phase source; and a third converter configured to generate a third voltage by rectifying a voltage across the third secondary winding, based on a third phase voltage from the three-phase source, wherein:
- the first converter is further configured to generate a fourth voltage by rectifying the voltage across the first secondary winding,
- the second converter is further configured to generate a fifth voltage by rectifying the voltage across the second secondary winding,
- the third converter is further configured to generate a sixth voltage by rectifying the voltage across the third secondary winding, and
- the apparatus further comprises a combiner configured to generate a seventh voltage based on an average of the first, second third, fourth, fifth, and sixth voltages.

21. The apparatus of claim 20, wherein the average is a weighted average.

22. The apparatus of claim 20, further comprising a controller configured to control the first, second, and third converters based on the seventh voltage.

* * * * *